April 10, 1934.                A. B. F. G. RICHARDSON                1,954,490
                MACHINE FOR WINDING STRIP MATERIAL ON ELECTRIC
                        CABLES AND FOR THE LIKE PURPOSES
                              Filed May 20, 1930                4 Sheets-Sheet 1
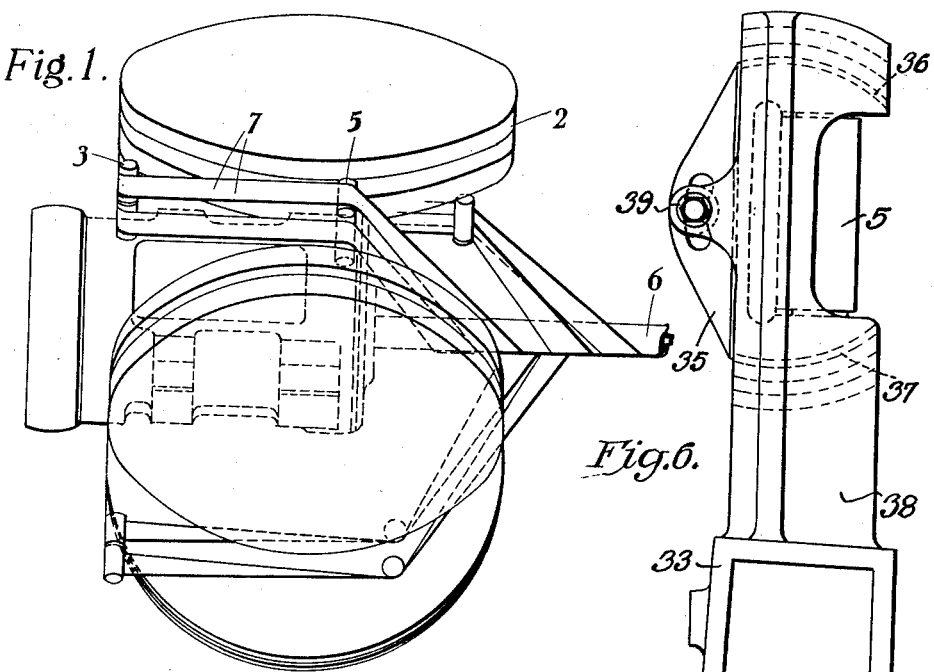
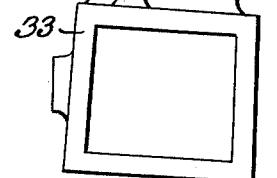
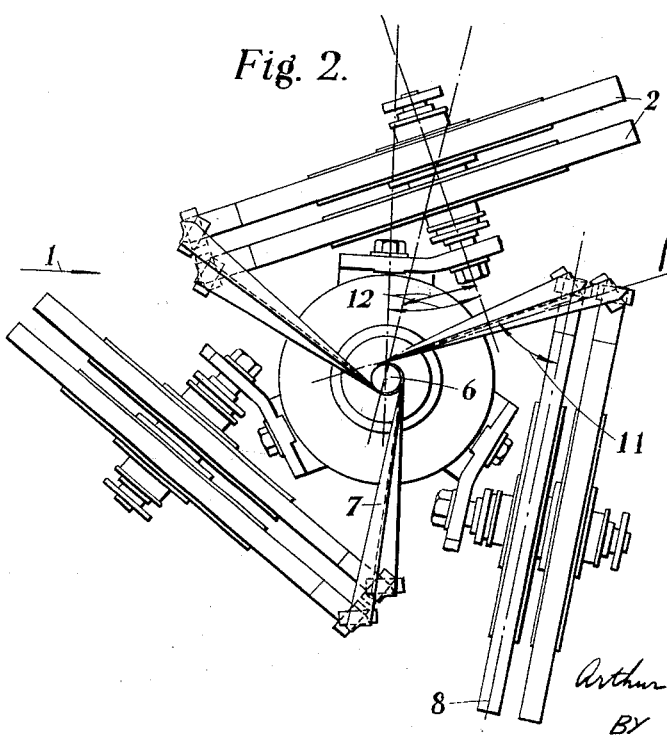
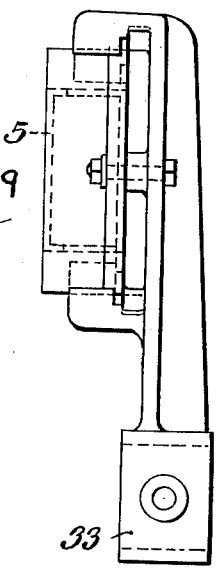
INVENTOR
Arthur B. F. G. Richardson
BY
Byrnes, Stebbins, Parmelee & Blenko
ATTORNEYS

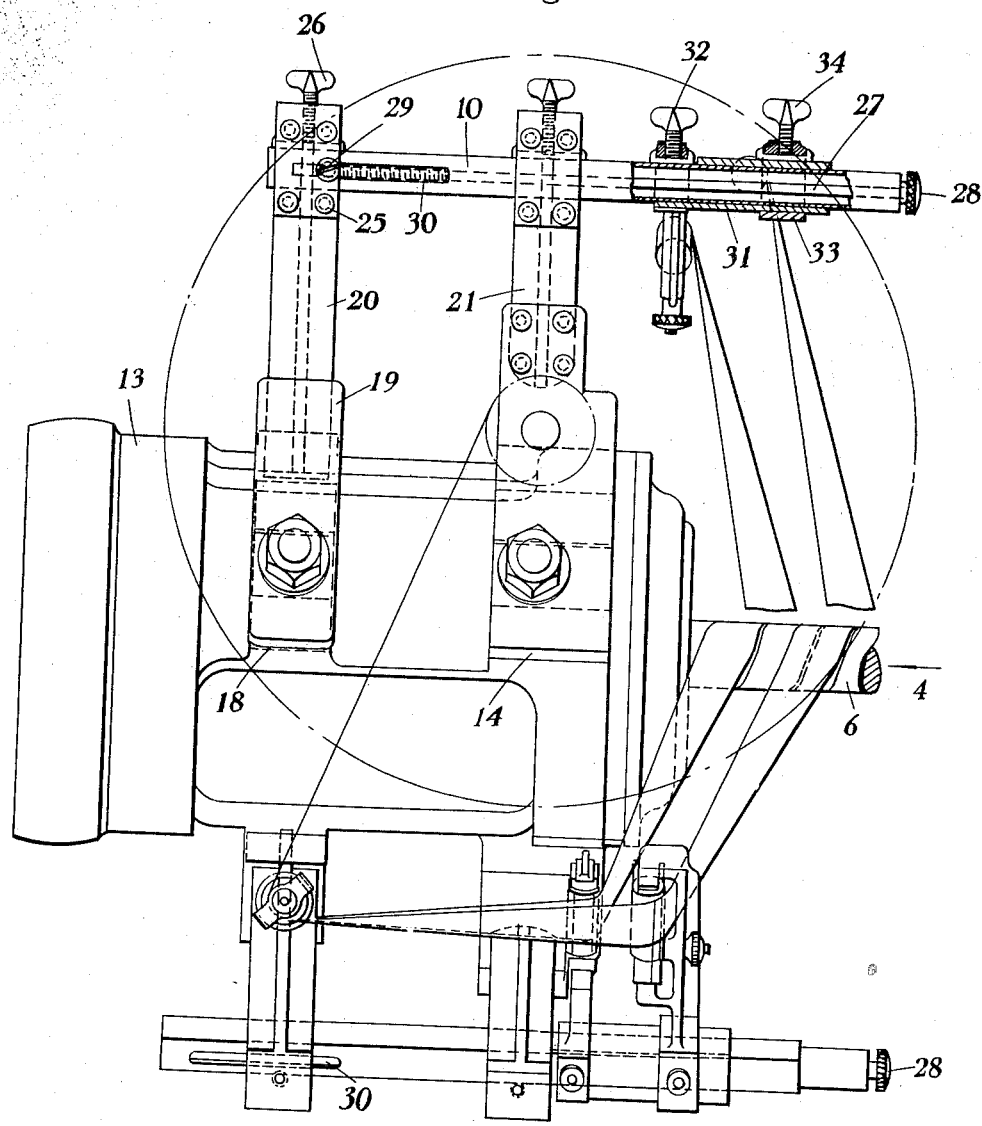

April 10, 1934.                A. B. F. G. RICHARDSON                 1,954,490
              MACHINE FOR WINDING STRIP MATERIAL ON ELECTRIC
                     CABLES AND FOR THE LIKE PURPOSES
                           Filed May 20, 1930           4 Sheets-Sheet 4
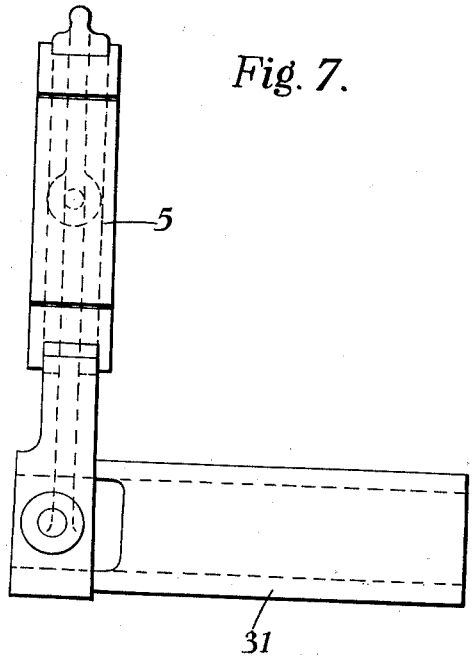
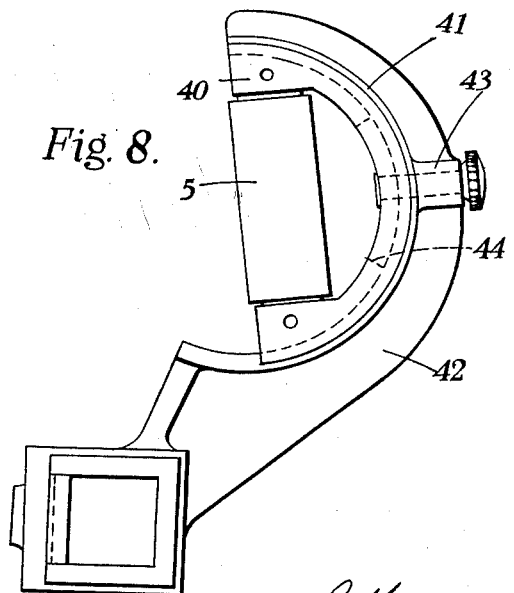

Patented Apr. 10, 1934

1,954,490

UNITED STATES PATENT OFFICE 1,954,490

MACHINE FOR WINDING STRIP MATERIAL ON ELECTRIC CABLES AND FOR THE LIKE PURPOSES

Arthur Bruce Fraser Gillespie Richardson, Belvedere, England, assignor to Callender's Cable and Construction Company Limited, London, England, a British company Application May 20, 1930, Serial No. 453,892
In Great Britain June 21, 1929

8 Claims. (Cl. 117—41)

This invention relates to machines for winding material in the form of a strip as a helix on a longitudinal member. For instance, it may be used for lapping paper on an electric cable. In such apparatus a member to be wrapped travels steadily forward through the machine and the strip material, which is wound up in form of a flat disc, is carried round the member and drawn off from the disc and guided on at the appropriate angle to the surface to be wrapped. Usually a number of different strips are applied simultaneously at different points in the length of the member so as to build up thereon a number of superposed layers.

The invention deals with the arrangement of discs of material and of the means for guiding the strip from those discs to the member to be covered, which will for convenience be spoken of hereinafter as the cable. In accordance with the invention, the spindles on which the discs of material are mounted have their axes arranged so as to be approximately radial to the axis of the cable and each strip is led off from the rear of its disc and its path from the disc to the cable is controlled by a pair of guides located between pairs of adjacent discs. By this arrangement, the discs can be brought nearer to the axis of rotation than with other arrangements and the strips can be led to the cable immediately in front of the head carrying the spindles, and through which head the cable passes as the strips are being applied to it. By bringing the discs nearer to the axis of rotation, a higher speed can be obtained. The arrangement also provides for a smooth application of the strips to the cable since these are brought down immediately in front of the head where the cable is supported, so that the whipping action of the cable produced by the application of the strips to the cable is reduced to a minimum.

The invention will be described by the aid of the accompanying drawings which show as an example the embodiment of the invention in a paper lapping machine in which each group of paper discs comprises three spindles, each carrying two discs side by side. In these drawings Figure 1 and Figure 2 show diagrammatically the relation of the discs and the guides to the cable and to each other. In these figures many structural features are omitted for the purpose of giving a clear view of the paths taken by the strips of paper.

Figure 1 is a side elevation looking in the direction of the arrow 1 in Figure 2, and it is to be noted that part of one pair of discs and of the paper strips coming from them are located behind other parts, and that for the sake of clearness no attempt has been made to show these hidden parts in broken lines.

Figure 2 is an end elevation.

Figure 3 is a side view of the machine head corresponding to Figure 1 but omitting all the paper discs except one.

Figures 5, 6, 7 and 8 show details of the mountings of the guide rollers.

Figure 4:
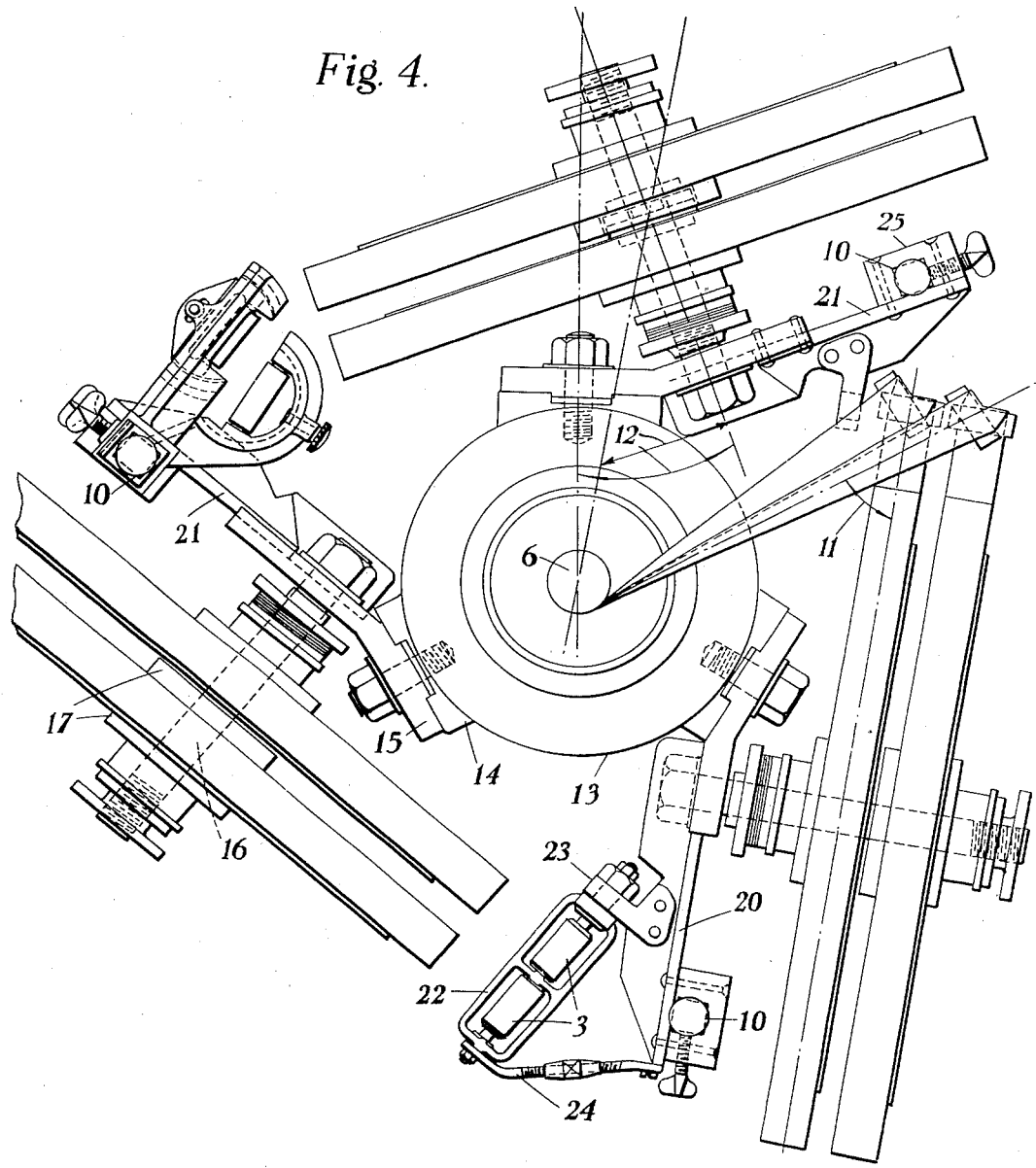
Figure 4 is an end elevation (looking in the direction of the arrow 4 on Figure 3) corresponding to Figure 2, showing structural parts of the machine.

The relative disposition of the parts and the paths taken by the strips of paper will first be described, reference being made to Figures 1 and 2. It will be seen that from each of the discs 2 a strip of paper 7 is led over the first guide roller 3 and thence over the second guide roller 5 and from that point passes on to the cable 6. The whole of the head with the six discs rotates about the axis of the cable 6 and the cable is drawn steadily forward so that each strip of paper is lapped on as a helix. The correct relative positions of the strips on the cable are determined by the location of the second guide rollers 5. The requirement of giving the correct lead of the strips on to the cable determines the positions of these second guide rollers 5. Between the first guide rollers 3 and the second guide rollers 5, each strip travels approximately parallel with the axis of the cable. At the first guide rollers 3 each strip turns through an angle which is approximately a right angle.

The preferable arrangement of the guides (which is the arrangement shown in these drawings) is such that the centre line of the strip between the disc and the first guide 3 lies in the central plane of the disc of material. The centre line of the strip between the first and second guides 3 and 5, and between the second guide and the cable, lies in a plane which is tangential to the cable. The first mentioned plane is shown for one of the discs, by the chain dotted line 8 Figure 2, and the last mentioned plane for the adjacent disc is shown by the line 9 of that figure.

This arrangement of discs and guides provides convenience and flexibility of adjustment for different conditions. The position of the disc need not in general be changed, all adjustments being made by acting upon the guides.

Each pair of guides 5 is preferably mounted on a bar which is parallel to the axis of the cable and the mounting is arranged to provide adjustments along this bar, thus providing for varying the positions of each strip on the cable in relation to the other strips. Such bars are shown at 10 of Figures 3 and 4 and will be hereafter referred to.

The guide rollers are preferably carried in frames providing adjustability. Between the guide rollers 3 and 5 the strip undergoes twisting and it is important that the second guide 5 should be angularly adjustable in order that the twisting may take place correctly and the strip may be led to the desired position on the cable. It has been indicated that the position of the axis of a disc approximates to the radial in relation to the axis of the cable. In order to minimize twisting of the paper it is however preferable that this axis should not actually be radial. With the disposition of guides 3 and 5, previously mentioned, it will be found that when viewed in a direction parallel with the axis of the cable, (see Figure 2) the direction in which the strip passes from the second guide 5 on to the cable makes an angle (e. g. the angle 11) with the direction in which the strip travels from the disc to the first guide, and it is advantageous to make the axis of the disc depart from the radial direction by an angle (e. g. the angle 12) about equal to half the angle between these two directions of the strip, this departure being in the sense which causes the guides to move towards the axis of the cable. It will be seen that the mounting of two discs on the same spindle will cause the angle such as 11 to be slightly different for the two strips.

Reference will now be made to the structural features shown in Figures 3–8. It will be seen that the head comprises a tubular frame 13. This frame is mounted at each end on bearings on a fixed tube, not shown, through which the cable 6 passes. On this frame are provided three facings 14 from each of which extends in a circumferential direction a bracket 15 in which is fixed the spindle 16 on which a pair of disc carriers 17 is mounted. Other facings 18 on the tubular frame 13 provide for the mounting of a second set of brackets indicated by 19; each of the brackets 19 carries an extension arm 20 and similar extension arms 21 are attached to the brackets 15. For convenience of illustration the bracket 21 is omitted from the lowest bar 10 of Figure 4 and certain other parts are omitted from the upper bars 10 of this figure, thereby permitting the remaining parts to be shown more clearly.

The first guide rollers 3 for the strips of paper are mounted on the extension arms 20 by means of the frame 22 carried by a bracket 23 and adjustable stay 24.

Each of the bars 10 is of rectangular section and is carried by the extension arms 20 and 21 in such a way that it can slide through the sockets 25 on the arms and be secured in position therein by the clamping screws 26. A fine adjustment of the position of the bar in the sockets can be obtained by means of the screw threaded spindle 27 which lies in the bar 10 and is operated by the knob 28 at the end of the rod. The screw threaded part of the spindle 27 engages with a nut, not shown, which lies within the bar 10 and is connected with the left hand socket 25 (see Figure 3) by means of the screw 29 which passes through the slot 30. This adjustment of the bar serves to obtain the final setting of the guide rollers 5.

The mounting of the guide rollers 5 is shown in detail by Figures 5–8. Figures 5 and 6 show two elevations, at right angles, of the carrier for the outer roller and Figures 7 and 8 show corresponding views of the carrier for the inner roller. This latter comprises a long tubular sleeve 31 adapted to fit on the bar 10 and to be clamped thereon by the screw 32 (Figure 3). The tubular socket 33 on the other carrier is adapted to fit on the outside of the sleeve 31 and to be clamped thereon by the screw 34 (Figure 3). This provides that the two rollers can be adjusted relative to each other to establish the correct relationship between their two strips as they are applied to the cable and the two carriers can then be adjusted together to obtain the correct relationship between their two strips and the other strips on the cable. To provide for the angular adjustment of the rollers 5 each roller is mounted in a frame moving in a circular track in the carrier arm. In Figure 6 the roller 5 is mounted in the frame 35 which works in circular tracks 36 and 37 in the carrier arm 38. This movement can be restrained frictionally to the desired extent or prevented entirely by the clamping bolt 39 passing through a bracket in the carrier 38 and a segmental slot in the frame 35. The other roller 5 is carried in a frame 40 (Figure 8) which works in a circular track 41 in a carrier arm 42 and is adapted to be restrained or locked by the clamping bolt 43 passing through the carrier arm 42 and engaging a slot 44 in the frame 40. The centre of each of the circular tracks 36, 37 and 41 is a point on the roller surface over which the centre line of the strip travels. If this mounting is free each roller will tend to set itself in the correct position under the influence of the pulls exerted by the two parts of the strip which are approaching and leaving the roller. It is, however, desirable that there should be some restraining force to prevent the influence of gravity and other sources of disturbance from being effective; hence the provision of the clamping bolts 39 and 43.

Examination of the drawings will make it evident that the arrangement is suitable for rotation in either direction. In Figure 2 the rotation is clockwise, in Figure 4 counter-clockwise rotation is indicated. It will be noted that the difference between the two cases is found in the angular positions is taken up by the guide rollers 5 to suit the change in the value of the angle 11.

In addition to the advantages previously indicated as obtained by the invention, it is found that the construction also has the effect of reducing the load on the main bearings of the head since it is possible to locate the centre of gravity of each of the three groups of discs and guides carried by the head so that it lies in a plane passing between the main bearings.

What I claim as my invention and desire to secure by Letters Patent is:—

1. A machine for winding strip material on electric cables and for the like purposes comprising a spindle adapted to carry a disc of the strip material, means for supporting the spindle and carrying it in relative rotary movement about the axis of the cable, the said supporting means carrying the spindle with its axis arranged approximately radial to the axis of the cable, two guides in the path of the strip between the disc and the cable disposed so that, at the first guide, the strip turns through an angle which is approximately a right angle and, between the guides, the strip travels approximately parallel with the axis of the cable, the said second guide being in the form of a roller and a mounting for said roller being provided comprising a circular track in which the roller is angularly adjustable, the centre of said track being a point on the roller surface over which the centre line of the strip travels.

2. A machine for winding strip material on electric cables and for the like purposes comprising a spindle adapted to carry a disc of the strip material, means for supporting the spindle and carrying it in relative rotary movement about the axis of the cable, the said supporting means carrying the spindle with its axis arranged approximately radial to the axis of the cable, and two guides in the path of the strip from the disc to the cable so arranged that, between the discs and the first guide, the centre line of the strip lies in the central plane of the disc and, between the first and second guides and between the second guide and the cable, the centre line of the strip lies in a plane which is tangential to the cable, the said second guide being in the form of a roller and a mounting for said roller being provided comprising a circular track in which the roller is angularly adjustable, the centre of said track being a point on the roller surface over which the centre line of the strip travels.

3. A machine for winding strip material on electric cables and for the like purposes, comprising a spindle adapted to carry a disc of the strip material, means for supporting the spindle and carrying it in relatively rotary movement about the axis of the cable, two guides located in the path of the strip from the disc to the cable and determining said path, the second guide which leads the strip on to the cable having the form of a roller, and a mounting for said roller comprising a circular track in which the roller is angularly adjustable, the center of said track being a point on the roller surface over which the center line of the strip travels.

4. A machine for winding strip material on electric cables and for the like purposes, comprising a spindle adapted to carry a disc of the material, means for supporting the spindle in a position approximately radial to the axis of the cable and for carrying it in relative rotary movement about the axis of the cable, and two guides for leading the strip from the disc to the cable, the guides being located approximately in the plane of the disc and adjacent to the periphery of the disc, and also in such positions that the strip can be led off from the rear part of the disc to the first guide and then be led from the first guide to the second guide in a path which is approximately parallel to the axis of the cable, and then be led from the second guide to the cable, at a place immediately in front of the supporting means for the cable and relatively close to the main bearing for the machine.

5. A machine for winding strip material on electric cables and for the like purposes, comprising more than two spindles each adapted to carry a disc of the strip material, means for supporting each of the spindles, in a position approximately radial to the axis of the cable and for carrying the spindles in relative rotary movement about the axis of the cable, and two guides for leading each strip from its disc to the cable, the guides for each strip being located approximately in the plane of the appropriate disc and between adjacent discs, and also in such positions that in each case the strip can be led off from the rear part of the disc to the first guide and then be led from the first guide to the second guide in a path which is approximately parallel to the axis of the cable, and then be led from the second guide to the cable at a place immediately in front of the supporting means for the cable and relatively close to the main bearing for the machine.

6. A machine for winding strip material on electric cables and for the like purposes, comprising a rotatably mounted tubular support through which the cable passes, more than two spindles mounted upon the tubular support and each adapted to carry a disc of the strip material in a position which is approximately radial to the axis of the cable, two guides for leading each strip from its disc to the cable and carried from the tubular support, the guides being located approximately in the plane of the appropriate disc and between adjacent discs, and also in such positions that, in each case, the strip can be led off from the rear part of the disc to the first guide and then be led from the first to the second guide in a path which is approximately parallel to the axis of the cable, and then be led from the second guide to the cable at a place immediately in front of the supporting means for the cable and relatively close to the main bearing for the machine.

7. A machine for winding strip material on electric cables and for the like purposes, comprising a rotatably mounted tubular support through which the cable passes, two guides for leading each strip to the cable, carried from the tubular support, more than two spindles mounted upon the tubular support and each adapted to carry a disc of the strip material in a position which is definitely displaced from the radial position with respect to the cable by a relatively small amount, the displacement being such as to bring the guides nearer to the axis of the cable, the two guides for each strip being located between adjacent discs and in such positions that in each case, the strip can be led off from the rear part of the disc to the first guide and then be led from the first to the second guide in a path which is approximately parallel to the axis of the cable, and then be led from the second guide to the cable at a place immediately in front of the supporting means for the cable and relatively close to the main bearing for the machine.

8. In a machine of the class described, a rotatable head having a plurality of spindles for supporting discs of material spaced around the periphery of the head, and arranged approximately radial to the axis of the cable, said head having a central opening therethrough for the movement of the cable to be wrapped, and a pair of guide members for each disc located between pairs of adjacent discs and so positioned that the material passes from the rear of each disc over the guides and then to the cable at a place immediately in front of the head.

ARTHUR BRUCE FRASER.
GILLESPIE RICHARDSON.